United States Patent [19]

Texier et al.

[11] 3,952,162

[45] Apr. 20, 1976

[54] TIME DIVISION DIGITAL SWITCHING NETWORK

[76] Inventors: Alain G. Texier, 32, Avenue du General de Gaulle, 92360 Meudon-la-Foret; Michel R. Davancens, 6, Parc de Diane, 78350 Jouy-en-Josas, both of France

[22] Filed: May 27, 1975

[21] Appl. No.: 581,081

[30] Foreign Application Priority Data

May 28, 1974 France .............................. 74.18467

[52] U.S. Cl. ...................... 179/15 AT; 179/15 BV; 179/15 BY
[51] Int. Cl.² ........................................ H04Q 11/04
[58] Field of Search ...... 179/15 AT, 15 AQ, 15 BY, 179/15 BV, 15 A, 15 BC

[56] References Cited
UNITED STATES PATENTS

| | | | |
|---|---|---|---|
| 3,715,508 | 2/1973 | Blasbalg........................... | 179/15 BC |
| 3,794,768 | 2/1974 | Carney............................ | 179/15 BA |
| 3,885,105 | 5/1975 | Hildenbrand................... | 179/15 BA |
| 3,890,469 | 6/1975 | Kelly .............................. | 179/15 AT |

*Primary Examiner*—David L. Stewart
*Attorney, Agent, or Firm*—Abraham A. Saffitz

[57] ABSTRACT

A time division digital switching network comprises first multiplexing means in which first-order digital data channels transmitting words consisting of a given number of bits and having first rates which are different from but multiples of one another undergo a first multiplexing converting them into a second-order digital data channels having a second predetermined rate. Thereafter there are provided second multiplexing means in which the second-order digital channels undergo a second multiplexing converting them into third-order digital data channels having a third predetermined rate. In a digital switching unit having at least one buffer store, the first-order-channel words multiplexed into the third-order channels are grouped at an address whose first part depends upon the second-order channel they occupy in the third-order channel and whose second part depends upon the first-order channel they occupy in the second-order channel. The bits of a given rank of the words of a second-order channel form a pseudorandom sequence having a known period and, therefore, the bits of a given rank of the words of a third-order channel form a number of interleaved pseudorandom sequences. The digital switching unit includes means for separating the interleaved pseudorandom sequences and for deducing from the bits composing them the second part of the address of the words.

6 Claims, 8 Drawing Figures

TIME DIVISION DIGITAL SWITCHING NETWORK

This invention relates to a time division digital switching network for switching time multiplexed synchronous data, more particularly to a time division switching network in which the synchronous data to be switched arise from the time multiplexing of component data of various rates. For instance, the data train to be switched may arise from time multiplexing of data of rates of 0.6, 2.4 and 9.6 kbit/s.

The multiplexing scheme for synchronous data transmission channels is defined in draft Recommendation X.50 of the International Telephone and Telegraph Consultative Committee. The multiplexing is a multiplexing using recurrent octets. Bit 1 of each octet is reserved for multiplex framing purposes, bits 2 to 7 are information bits and bit 8 is a status bit. The addition of framing and status bits results in a 38 % increase in bit rate, so that channel flow rates are:

12.8 kbit/s for the 9.6 kbit/s user rate;
3.2 kbit/s for the 2.4 kbit/s user rate;
800 kbit/s for the 600 bit/s user rate.

A 64 kbit/s channel can be formed by multiplexing five 12.8 kbit/s channels or twenty 3.2 kbit/s channels or eighty 800 bit/s channels, the 12.8 kbit/s channel repeating every 5th octet (5-octet frame), the 3.2 kbit/s channel repeating every 20th octet (20-octet frame) and the 800 bit/s channel repeating every 80th octet (80-octet frame). The lowest common multiple of the octet numbers of the various frames is 80 and this is the number taken to define the multiframe.

The 80 octets forming a multiframe are detected by their first bits which form a multiframing locking sequence. This sequence is a pseudorandom sequence having a periodicity of 80 produced by means of a shift register, some intermediate stages and the final stage thereof being looped back to the input stage via an "Exclusive OR" gate. Of course, if the shift register has $n$ stages and if $p$, $q$ and so on denote the ranks of the intermediate stages looped back to the input, the sequence produced by the register has a period which is a sub-multiple of $(2^n-1)$ and can have associated with it the modulo 2 polynomial of variable x in accordance with:

$$x^0 + \ldots + x^p + \ldots + x^q + \ldots + x^n$$

In the polynomial is primitive, the consecutive contents of the shift register are completely different $n$-bit words and the period is $(2^n-1)$. Consequently, if the $(2^n-1)$-bits of the sequence are aligned and if $n$ consecutive bits of the alignment are isolated by means of a window, moving the window stepwise provides $(2^n-1)n$-bit words all different from one another.

In the sequence of words each word can be considered as a binary combination having a decimal value, and so the sequence of words can be considered as a sequence of decimal values. If X denotes a decimal combination in the sequence, the possible combinations which can come next are a priori:

$$2X + 0 \atop 2X + 1 \quad (\text{modulo } 2^n - 1)$$

The following (next) combination is indicated as $2X + f(X)$.

Of course, in the sequence of decimal values the separation between the ranks of any given decimal value and the decimal value $2X + f(X)$ takes all the values between 1 and $2^n-1$ when the given decimal value $X$ varies; consequently, and as will be described hereinafter, the length of the sequence can be shortened or abbreviated.

Since the multiframe is 80 bits long, a 7-stage register giving a natural sequence of $2^7-1 = 127$ bits is required. The associated polynominal must be primitive and amongst the 7th-degree polynomials there is chosen, e.g., $$1 + x^4 + x^7$$

and a bit F is defined so that:

$$F(x) = x_0 = x_4 + x_7$$

in which $x_0$, $x_4$ and $x_7$ denote the bits in the first, fourth and seventh stages of the shift register. Consequently, the 4th and 7th stages are the ones to be looped back to the input stage via the "Exclusive OR" gate.

The sequence is shortened or abbreviated or reduced from 127 to 80 by an approximation process consisting of inverting the reinsertion bit when shift register contains a particular decimal combination. If $X$ is such a decimal combination, the next combination which should of course be $2X + F(x)$ is brought by approximation to the value $2X + \overline{F(x)}$.

Table I given hereinafter illustrates the natural 127-bit sequence and the approximated shortened 80-bit sequence. In the tables there is written below each bit the decimal value represented by the 7-bit word whose lowest-weight bit is precisely such bit.

The use of Table II will be explained later on.

TABLE I

| 1 | 1 | 1 | 1 | 1 | 1 | 1 | 0 | 0 | 0 | 0 | 1 | 1 | 1 | 0 | 1 | 1 | 1 | 1 | 0 |
|---|---|---|---|---|---|---|---|---|---|---|---|---|---|---|---|---|---|---|---|
| 113 | 99 | 71 | 15 | 31 | 63 | 127 | 126 | 124 | 120 | 112 | 97 | 67 | 7 | 14 | 29 | 59 | 119 | 111 | 94 |
| 1 | 2 | 3 | 4 | 5 | 6 | 7 | 8 | 9 | 10 | 11 | 12 | 13 | 14 | 15 | 16 | 17 | 18 | 19 | 20 |
| 0 | 1 | 0 | 1 | 1 | 0 | 0 | 1 | 0 | 0 | 1 | 0 | 0 | 0 | 0 | 0 | 0 | 1 | 0 | 0 |
| 60 | 121 | 114 | 101 | 75 | 22 | 44 | 89 | 50 | 100 | 73 | 18 | 36 | 72 | 16 | 32 | 64 | 1 | 2 | 4 |
| 21 | 22 | 23 | 24 | 25 | 26 | 27 | 28 | 29 | 30 | 31 | 32 | 33 | 34 | 35 | 36 | 37 | 38 | 39 | 40 |
| 0 | 1 | 0 | 0 | 1 | 1 | 0 | 0 | 0 | 1 | 0 | 1 | 1 | 1 | 0 | 1 | 0 | 1 | 1 | 0 |
| 8 | 17 | 34 | 68 | 9 | 19 | 38 | 76 | 24 | 49 | 98 | 69 | 11 | 23 | 46 | 93 | 58 | 117 | 107 | 86 |
| 41 | 42 | 43 | 44 | 45 | 46 | 47 | 48 | 49 | 50 | 51 | 52 | 53 | 54 | 55 | 56 | 57 | 58 | 59 | 60 |
| 1 | 1 | 0 | 0 | 0 | 0 | 0 | 1 | 1 | 0 | 0 | 1 | 1 | 0 | 1 | 0 | 1 | 0 | 0 | 1 |
| 45 | 91 | 54 | 108 | 88 | 48 | 96 | 65 | 3 | 6 | 12 | 25 | 51 | 102 | 77 | 26 | 53 | 106 | 84 | 41 |
| 61 | 62 | 63 | 64 | 65 | 66 | 67 | 68 | 69 | 70 | 71 | 72 | 73 | 74 | 75 | 76 | 77 | 78 | 79 | 80 |
| 1 | 1 | 0 | 0 | 1 | 1 | 1 | 1 | 0 | 1 | 1 | 0 | 1 | 0 | 0 | 0 | 1 | 0 | 0 | 1 |
| 83 | 39 | 78 | 28 | 57 | 115 | 103 | 79 | 30 | 61 | 123 | 118 | 109 | 90 | 52 | 104 | 80 | 33 | 66 | 5 |
| 81 | 82 | 83 | 84 | 85 | 86 | 87 | 88 | 89 | 90 | 91 | 92 | 93 | 94 | 95 | 96 | 97 | 98 | 99 | 100 |
| 0 | 1 | 0 | 1 | 1 | 1 | 1 | 0 | 1 | 0 | 0 | 1 | 0 | 1 | 0 | 0 | 0 | 0 | 1 | 1 |
| 10 | 21 | 42 | 85 | 43 | 87 | 47 | 95 | 62 | 125 | 122 | 116 | 105 | 82 | 37 | 74 | 20 | 40 | 81 | 35 |
| 101 | 102 | 103 | 104 | 105 | 106 | 107 | 108 | 109 | 110 | 111 | 112 | 113 | 114 | 115 | 116 | 117 | 118 | 119 | 120 |
| 0 | 1 | 1 | 1 | 0 | 0 | 0 | 1 | 1 | 1 | 1 | 1 | 1 |  |  |  |  |  |  |  |
| 70 | 13 | 27 | 55 | 110 | 92 | 56 | 113 | 99 | 71 | 15 | 31 | 63 | 127 |  |  |  |  |  |  |
| 121 | 122 | 123 | 124 | 125 | 126 | 127 |  |  |  |  |  |  |  |  |  |  |  |  |  | second cycle beginning

TABLE II

(first part)

| a | b | c | d | a | b | c | d |
|---|---|---|---|---|---|---|---|
| 113 | 56 | 1 | 10 | 88 | 44 | 0 | 90 |
| 99 | 49 | 1 | 49 | 48 | 24 | 0 | 111 |
| 71 | 35 | 1 | 118 | 96 | 48 | 0 | 72 |
| 15 | 7 | 1 | 11 | 65 | 32 | 1 | 96 |
| 31 | 15 | 1 | 84 | 3 | 1 | 1 | 97 |
| 63 | 31 | 1 | 103 | 6 | 3 | 0 | 71 |
| 127 | 63 | 1 | 1 | 12 | 6 | 0 | 51 |
| 126 | 63 | 0 | 126 | 25 | 12 | 1 | 104 |
| 124 | 62 | 0 | 101 | 51 | 25 | 1 | 83 |
| 120 | 60 | 0 | 12 | 102 | 51 | 0 | 13 |
| 112 | 56 | 0 | 117 | 77 | 38 | 1 | 100 * |
| 97 | 48 | 1 | 55 | 26 | 13 | 0 | 47 |
| 67 | 33 | 1 | 86 | 53 | 26 | 1 | 18 |
| 7 | 3 | 1 | 56 | 106 | 53 | 0 | 108 |
| 14 | 7 | 0 | 116 | 84 | 42 | 0 | 25 |
| 29 | 14 | 1 | 68 | 41 | 20 | 1 | 38 |
| 59 | 29 | 1 | 40 | 83 | 41 | 1 | 33 |
| 119 | 59 | 1 | 74 | 39 | 19 | 1 | 92 |
| 111 | 55 | 1 | 106 | 78 | 39 | 0 | 5 |
| 94 | 47 | 0 | 88 | 28 | 14 | 0 | 59 |
| 60 | 30 | 0 | 69 | 57 | 28 | 1 | 42 |
| 121 | 60 | 1 | 115 | 115 | 57 | 1 | 64 |
| 114 | 57 | 0 | 63 | 103 | 51 | 1 | 114 |
| 101 | 50 | 1 | 6 | 79 | 39 | 1 | 122 |
| 75 | 37 | 1 | 91 | 30 | 15 | 0 | 43 |
| 22 | 11 | 0 | 28 | 61 | 30 | 1 | 58 |
| 44 | 22 | 0 | 34 | 123 | 61 | 1 | 20 |
| 89 | 44 | 1 | 37 | 118 | 59 | 0 | 53 |
| 50 | 25 | 0 | 44 | 109 | 54 | 1 | 98 |

(second part)

| a | b | c | d | a | b | c | d |
|---|---|---|---|---|---|---|---|
| 100 | 50 | 0 | 121 | 90 | 45 | 0 | 95 |
| 73 | 36 | 1 | 3 | 52 | 26 | 0 | 109 |
| 18 | 9 | 0 | 14 | 104 | 52 | 0 | 17 |
| 36 | 18 | 0 | 82 | 80 | 40 | 0 | 22 |
| 72 | 36 | 0 | 124 | 33 | 16 | 1 | 65 |
| 16 | 8 | 0 | 7 | 66 | 33 | 0 | 41 |
| 32 | 16 | 0 | 62 | 5 | 2 | 1 | 67 |
| 64 | 32 | 0 | 31 | 10 | 5 | 0 | 79 |
| 1 | 0 | 1 | — | 21 | 10 | 1 | 15 |
| 2 | 1 | 0 | 30 | 42 | 21 | 0 | 2 |
| 4 | 2 | 0 | 60 | 85 | 42 | 1 | 102 |
| 8 | 4 | 0 | 4 | 43 | 21 | 1 | 125 |
| 17 | 8 | 1 | 120 | 87 | 43 | 1 | 81 |
| 34 | 17 | 0 | 77 | 47 | 23 | 1 | 75 |
| 68 | 34 | 0 | 8 | 95 | 47 | 1 | 39 |
| 9 | 4 | 1 | 123 | 62 | 31 | 0 | 24 |
| 19 | 9 | 1 | 113 | 125 | 62 | 1 | 26 |
| 38 | 19 | 0 | 35 | 122 | 61 | 0 | 107 |
| 76 | 38 | 0 | 27 | 116 | 58 | 0 | 73 |
| 24 | 12 | 0 | 23 | 105 | 52 | 1 | 110 |
| 49 | 24 | 1 | 16 | 82 | 41 | 0 | 94 |
| 98 | 49 | 0 | 78 | 37 | 18 | 1 | 45 |
| 69 | 34 | 1 | 119 | 74 | 37 | 0 | 36 |
| 11 | 5 | 1 | 48 | 20 | 10 | 0 | 112 |
| 23 | 11 | 1 | 99 | 40 | 20 | 0 | 89 |
| 46 | 23 | 0 | 52 | 81 | 40 | 1 | 105 |
| 93 | 46 | 1 | 70 | 35 | 17 | 1 | 50 |
| 58 | 29 | 0 | 87 | 70 | 35 | 0 | 9 |
| 117 | 58 | 1 | 54 | 13 | 6 | 1 | 76 |
| 107 | 53 | 1 | 19 | 27 | 13 | 1 | 80 |
| 86 | 43 | 0 | 46 | 55 | 27 | 1 | 66 * |
| 45 | 22 | 1 | 93 | 110 | 55 | 0 | 21 |
| 91 | 45 | 1 | 32 | 92 | 46 | 0 | 57 |
| 54 | 27 | 0 | 61 | 56 | 28 | 0 | 85 |
| 108 | 54 | 0 | 29 | | | | |

— — — shorted part of the sequence

Table II gives the "distances" or spacings in the sequence between two decimal numbers of the pseudorandom sequence whose quotient by 2 is the same — i.e., it gives the distance between numbers defining pairs of two consecutive numbers, the first of which is even and the second odd.

More particularly, if in decimal code $a$ denotes the decimal number equal to the binary 7-bit combination, $b$ denotes the decimal number equal to the binary combination formed by the 6 heavy-weight bits and $c$ denotes the lightest-weight bit, then:

$$a = 2b + c$$

The pseudorandom 127-bit sequence of Table I is reproduced in column $c$ of Table II. Column $d$ thereof indicates the distance between any 6-bit combination and the same 6-bit combination—i.e., the distance between any two combinations in which $b$ has the same value.

For instance, if $a = 113$, $b = 56$ and $c = 1$, the distance $d = 10$ is counted between 113 and 112.

If $a = 112$, $b = 56$ and $c = 0$, the distance $d = 117$ is counted between 112 and 113.

In short, table II gives $(2^n - 2)$ values of $d$ which in pairs are complementary to 127. Table II shows that the 126 distances $d$ are different.

Of course, the same property would be present if, instead of counting the distances between the pairs (2,3), (4,5), (126,127), they had been counted between the pairs (1,2), (3,4), ... (125,126).

According to the invention, the time division digital switching network comprises: first multiplexing means in which first-order digital data channels transmitting words consisting of a given number of bits and having first rates which are different from but multiples of one another undergo a first multiplexing converting them into second-order digital data channels having a second predetermined rate; second multiplexing means in which the second-order digital channels undergo a second multiplexing converting them into third-order digital data channels having a third predetermined rate; and a digital switching unit having at least one buffer store in which the first-order-channel words multiplexed into the third-order channels are grouped at an address whose first part depends upon the second-order channel they occupy in the third-order channel and whose second part depends upon the first-order channel they occupy in the second-order channel. The said switching network is characterized in that the bits of a given rank of the words of a second-order channel form a pseudorandom sequence having a known period and consequently the bits of a given rank of the words of a third-order channel form a number of interleaved pseudorandom sequences; and in that the said digital switching unit includes means for separating the interleaved pseudorandom sequences and for deducing from the bits composing them the second part of the address of the words.

Hereinafter the data words are octets and the bits of given rank of the words forming the pseudorandum sequences are the first bits of the octets.

The invention will now be described in detail with reference to the accompanying drawings wherein.

Figure 1A:
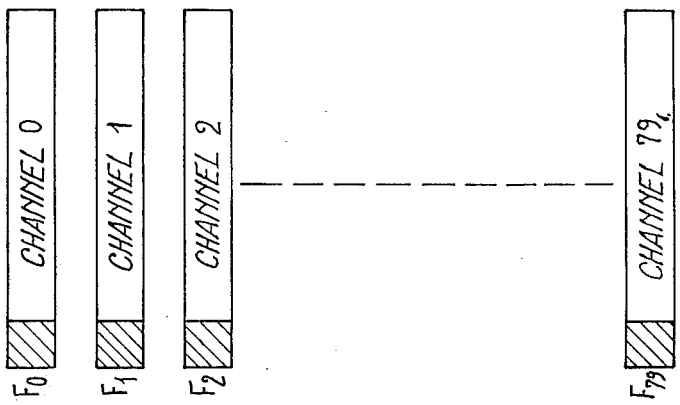
FIGS. 1a, 1b and 1c represent the multiplexing of the octets by 5, 20 and 80 respectively.
Figure 1B:
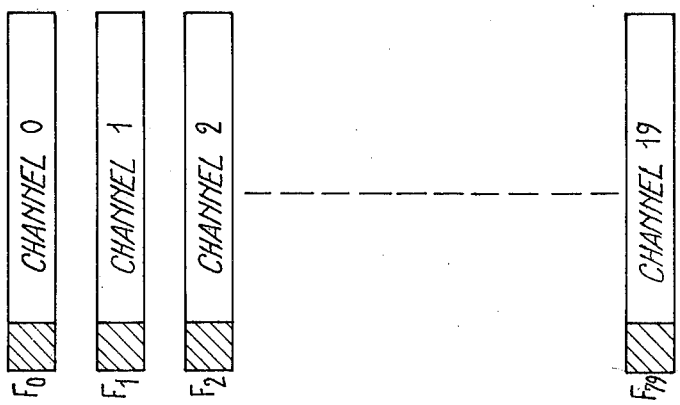
Figure 1C:
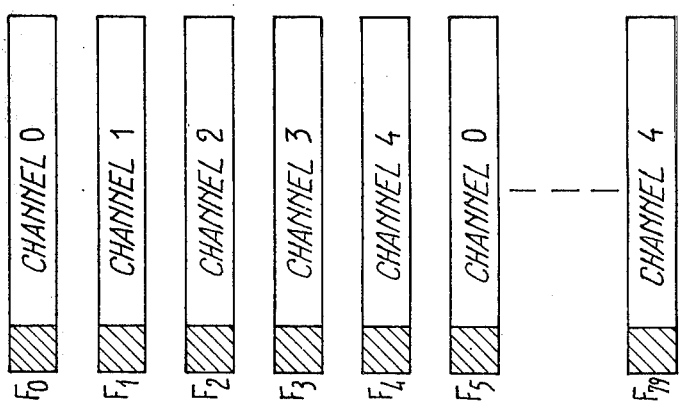

Referring first to FIGS. 1a, 1b, 1c, there can be seen consecutive octets arising from the multiplexing of five channels 0 to 4 in FIG. 1a, of 20 channels 0 to 19 in FIG. 1b and of 80 channels 0 to 79 in FIG. 1c. The channel number is written in the octet. Bits $F_0$ to $F_{79}$ of the pseudorandom sequence are the first bits of the octets. There are 16 frames in the multiframe of FIG. 1a, four frames in the multiframe of FIG. 1b, and the frame of FIG. 1c is equal to the multiframe.

Figure 2:
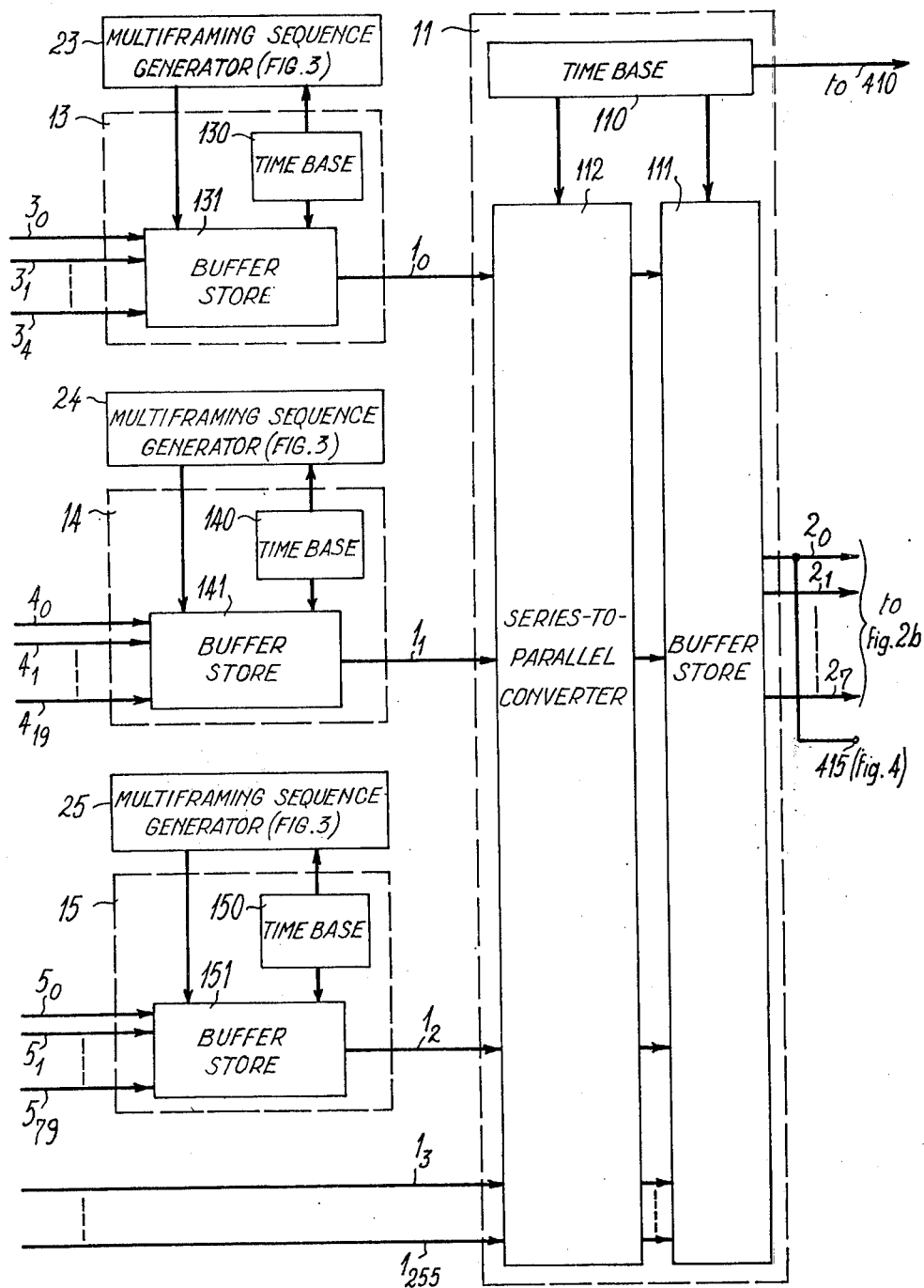
FIGS. 2a, 2b and 2c are diagrams in block schematic form of the time division digital switching network, the input multiplexers and the output demultiplexers.
Figure 2B:
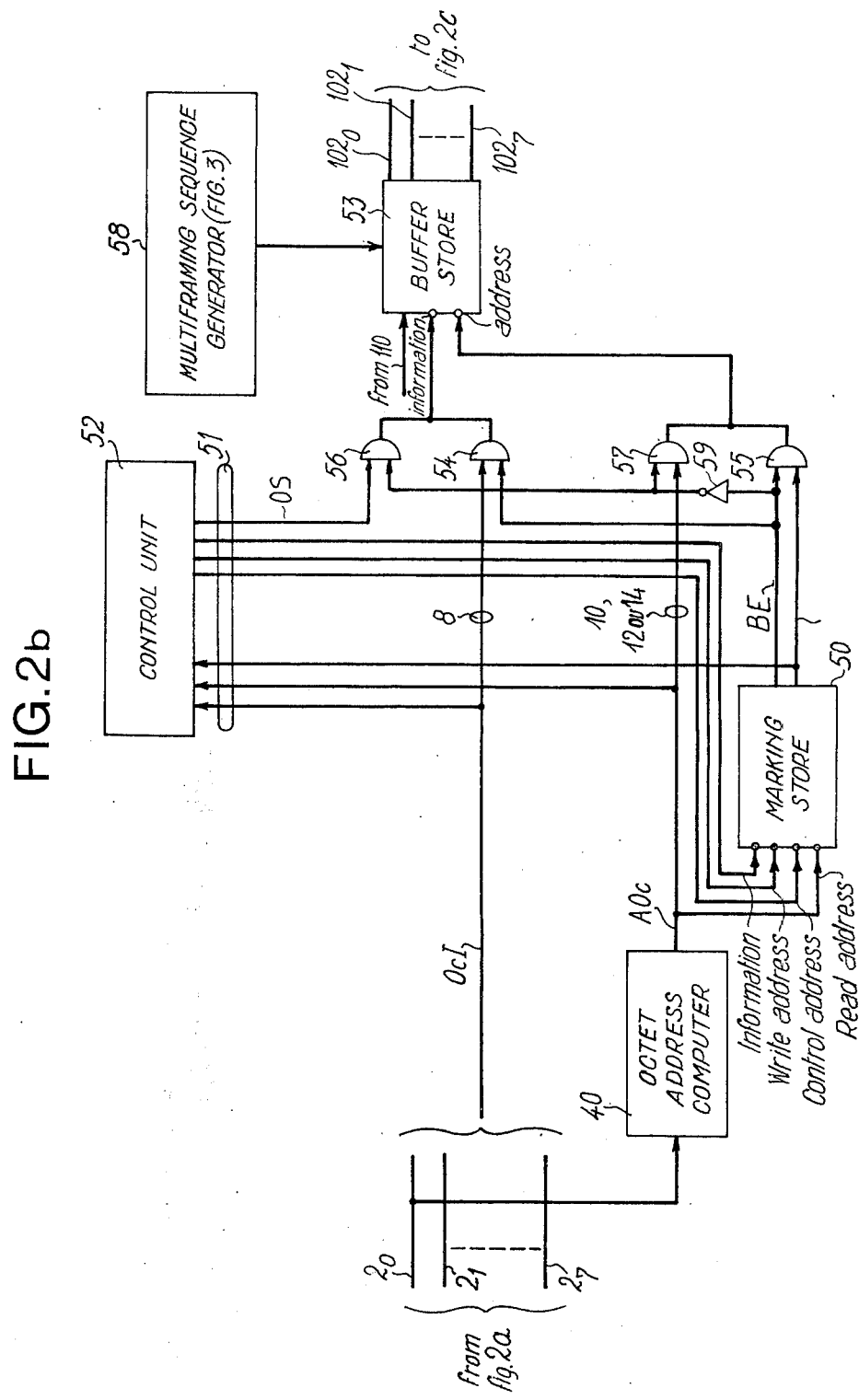
Figure 2C:
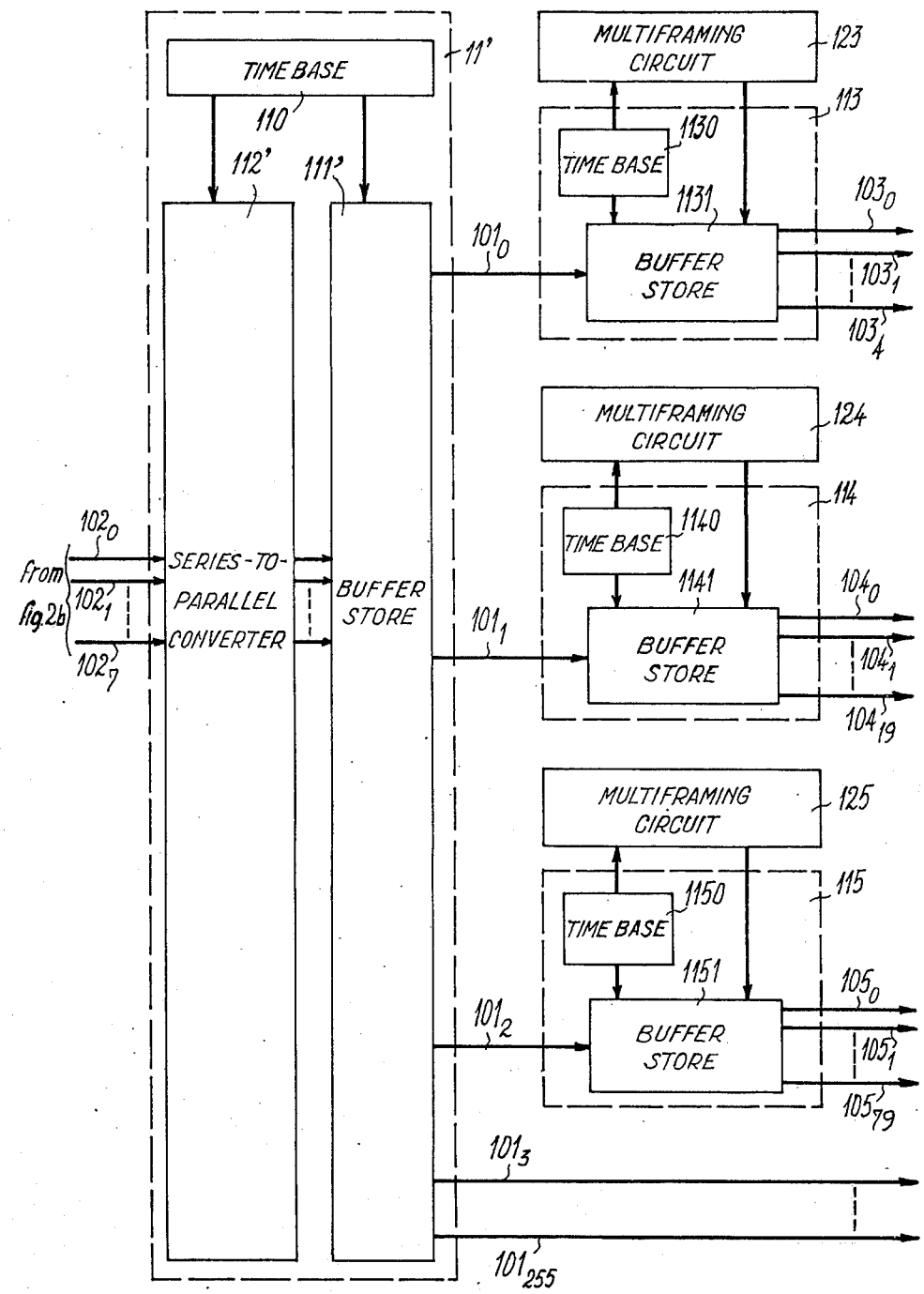

Referring now to FIG. 2, incoming 64 kbit:s time division multiplex channels $1_0$ to $1_{255}$ are multiplexed at 8 multiplex parallel interfaces $2_0$ to $2_7$ each on a 2.048 Mbits/s rate — i.e., where the time slots allotted to the incoming pultiplex channels are 125/256 $\mu$s, i.e., about 0.5 $\mu$s. The eight multiplex interfaces 20 to 27 transmit the octets in parallel.

The incoming channels $1_0$ to $1_{225}$ are, e.g., type $J_3$ channels each having three channels, one transmitting data at 64 kbit/s, the second a bit clock signal at 64 kHz and the third an octet clock signal at 8 kHz.

It is assumed in connection with FIG. 2 that channel $1_0$ arises from the multiplexing of five 12.8 kbit/s elementary channels $3_0$ to $3_4$, channel $1_1$ arises from the multiplexing of twenty 3.2 kbit/s elementary channels $4_0$ to $4_{19}$ and channel $1_2$ arises from the multiplexing of eighty 800 bit/s elementary channels $5_0$ to $5_{79}$. The respective multiplexings are carried out in multiplexers 13–15. Multiplexing of the 256/64 kbit/s channels is carried out in a multiplexer 11.

Each multiplexer 11, 13, 14, 15 comprises in known manner a respective time base 110, 130, 140, 150 producing clock pulses at the frequency of the input data and clock pulses at the frequency of the outgoing data, and a respective buffer store 111, 131, 141, 151.

The octets are written into the buffer store 131 or 141 or 151 at the rate of the clock pulses at the frequency of the input data and, during write-in, the first bit, which is the framing bit, is removed and replaced by a bit F of the multiframing sequence produced by a respective multiframing locking sequence generator 23, 24 or 25.

Figure 3:
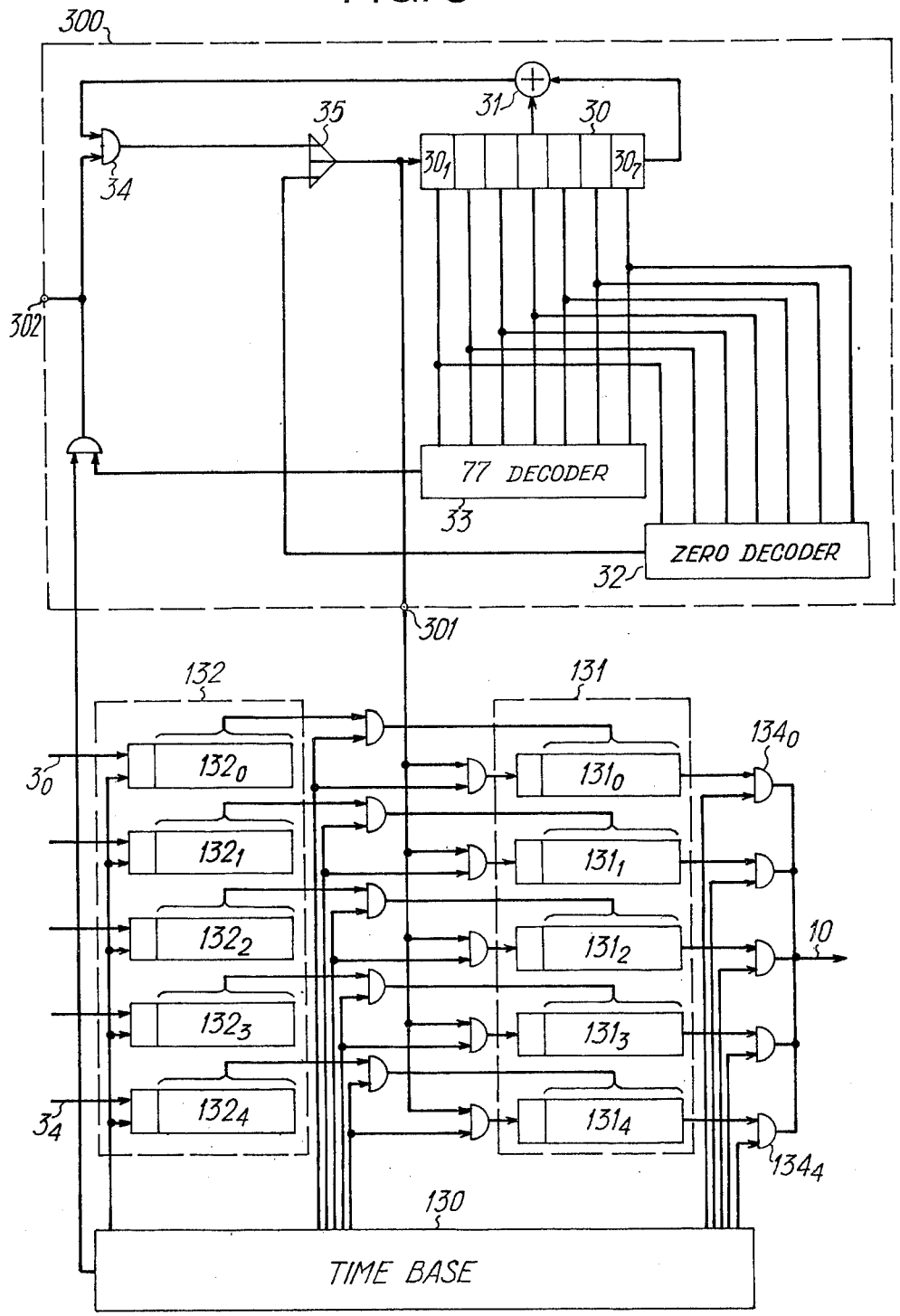
FIG. 3 shows the generator producing the multiframing sequence.

One such generator 300 is shown in FIG. 3 and comprises a shift register 30 having seven stages $30_1$ to $30_7$ and a reinserting circuit embodied by an "Exclusive OR" gate 31 receiving at each step-on-cycle of the register the bits $x_4$ and $x_7$ present in the fourth stage $30_4$ and seventh stage $30_7$ respectively and reintroducing the bit $x_0$ into the first stage. The reinsertion function is therefore:

$$x_0 = x_4 \oplus x_7$$

The primitive polynomial associated with the register is:

$$1 + x^4 + x^7$$

and the sequence is merely the quotient of a polynomial consisting entirely of ones by the latter polynomial. The register stages $30_1$ to $30_7$ are connected to a zero decoder 32 and to a abbreviation jump combination decoder 33. As explained in the opening part hereof, in the example selected the abbreviation jump control combination is:

$$1\ 0\ 0\ 1\ 1\ 0\ 1 = 77$$

The reinsertion loop extends by way of an AND gate 34 which receives a "one" from the decoder 33 when the same decodes the combination 77, and by way of an OR gate 35, which receives a "one" from the decoder 32 when the same decodes the combination zero. The bits of the multiframing sequence appear at terminal 301 and the multiframing abbreviation jump control bit appears at terminal 302.

Also visible in FIG. 3 are time base 130 and buffer store 131 of multiplexer 13 and a series-to-parallel converter 132. The octets arriving on the multiplex channels $3_0$ to $3_4$ are written into shift registers $132_0$ to $132_4$ of the converter 132 under the control of time base 130. Also under the control thereof, the last 7 bits of each octet are transferred from the shift registers $132_0$ to $132_4$ into the last seven stages of the shift registers $131_0$ to $131_4$ respectively. Simultaneously, the multiframing sequence bits F are distributed amongst the first stages of registers $131_0$ to $131_4$ by time base 130. The time base also opens AND gates $134_0$ to $134_4$ sequentially, the outputs thereof being connected in parallel to the multiplex circuit $1_0$.

Multiplexer 11 comprises a time base 110, a series-to-parallel converter 112 and a buffer store 111 in conventional manner. Time base 110 defines approximately 16 $\mu$s input time slots and 0.5 $\mu$s output time slots. The bits are in series at the input and an octet takes up a 125 $\mu$s time slot. The octets are in parallel at the output and take up a 0.5 $\mu$s time slot.

Multiplexer 11 is associated with an octet address computer 40 which is connected to that of the 2.408 Mbits/s multiplexed interfaces transmitting the first bits of the octets (assumed to be the interface $2_0$) and which is connected to time base 110. The octets and their first bit form 256 interleaved sequences. As already stated, each octet has an address in two parts. The first part of the address is between 0 and 255 and is the rank of the octet in the frame of 256 0.5 $\mu$s slots forming the 2.048 Mbits/s parallel multiplex. The first part of the address therefore contains 8 bits. The second part of the address is the rank of the octet in the 80-octet multiframe. However, the number of bits in the second address part varies according as the 64 kbit/s channel was formed by the multiplexing of 5 or 20 or 80 octets. In the first case, there are only five channels in the multiframe, each having 16 repeating octets, and thus the second address part is between 0 and 4 and has 3 bits. In the second case, there are 20 channels in the multiframe, each having 4 repeating octets and thus the second part of the address is between 0 and 19 and has 5 bits. In the third case, there are 80 channels in the multiframe and each channel has only 1 octet, and thus the second part of the address is between 0 and 79 and has 7 bits.

Figure 4:
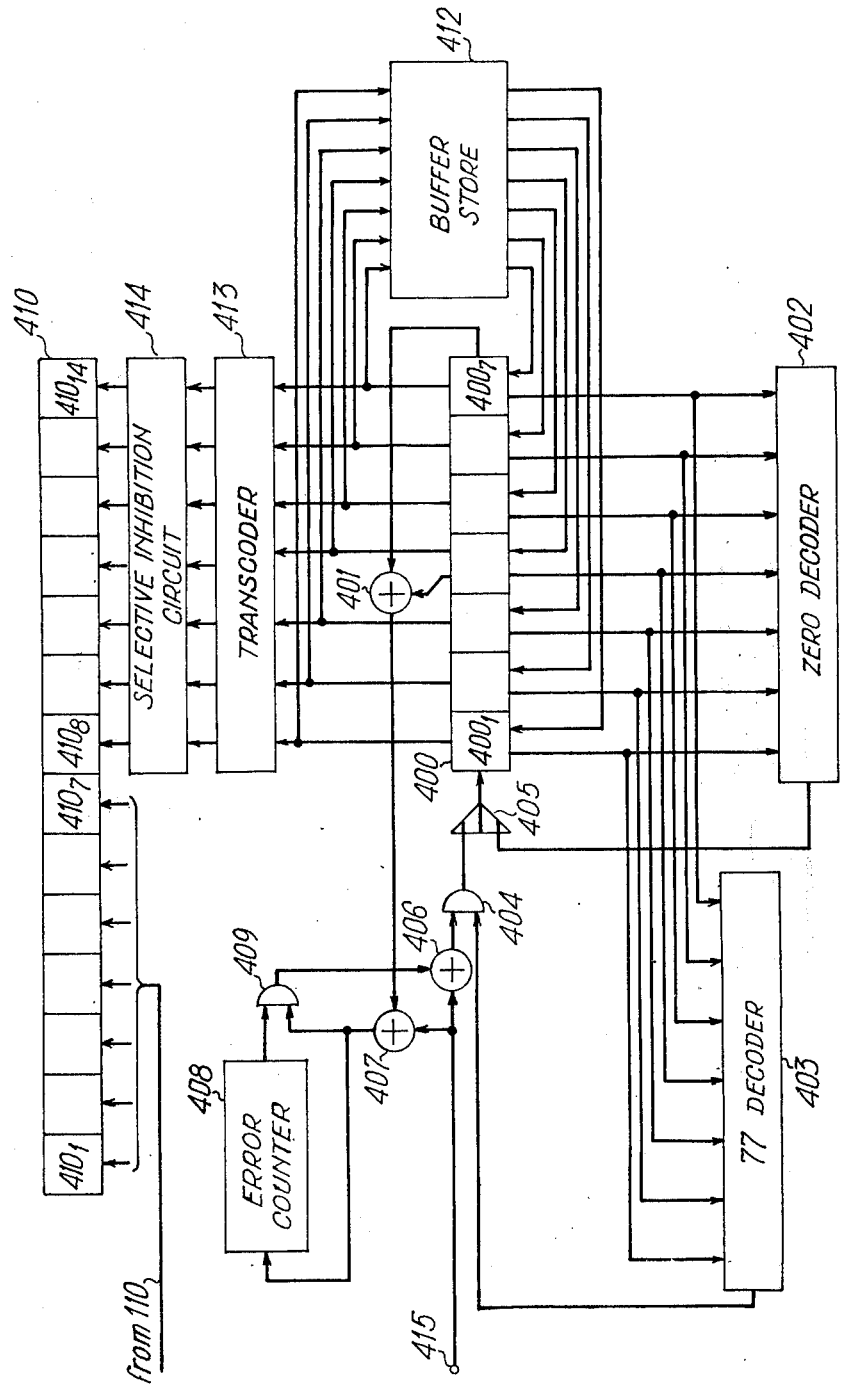
FIG. 4 shows the multiframing and overlap circuit.

The octet address computer 40 is shown in FIG. 4 and also serves as the multiframing and multiframe overlap circuit.

The sequence of bits F' appearing at interface $2_0$ is applied to input terminal 415. If synchronization is correct the sequence F' is merely the multiframing locking sequence F. The bits of the sequence F' are applied to shift register 400 through an "exclusive OR" gate 406, an AND gate 404 and an OR gate 405. Register 400 is identical to register 30 and, like the latter, has seven stages $400_1$ to $400_7$ which are connected to a zero decoder 402 and to an abbreviation jump combination decoder 403. Stages $400_4$ and $400_7$ are connected to the "Exclusive OR" gate 401 and the ouput thereof, instead of being directly connected to the input of AND gate 404 (just as the output of the "Exclusive OR" gate 31 is directly connected to the input of AND gate 34), is connected to one of the inputs of the "Exclusive OR" gate 407. Also, the outputs of the decoders of the combinations 0 and 77 are connected to gates 405 and 404 in just the same way as in FIG. 3. The only difference between FIG. 3 and FIG. 4 is that in the latter the reinserting loop also includes the "Exclusive OR" gates 406 and 407.

Element 407 receives the sequence F' from terminal 415 and the sequence F from element 401 and produces the sequence F $\oplus$ F', which is the error signal E and appears at the output of 407. Signal E is applied to an error counter 408 and to an AND gate 409 which possibly receives a loss-of-synchronism signal from counter 408. The latter signal corresponds to a predetermined number of error signals. The output of AND gate 409 is connected to the second input of the "Exclusive OR" gate 406.

In normal conditions — i.e., when there is synchronism — the signal from counter 408 applied to AND gate 409 is a one. The output signal of 409 is the error signal:

$$E = F \oplus F'$$

The output signal of the element 406 is:

$$F' \oplus F \oplus F' = F$$

Register 400 is therefore looped on itself exactly like register 30 in FIG. 3. If a bit F' is wrong, the system is auto-correcting since what is reinjected is F and not F'. If there is loss of synchronism the counter 408 outputs a zero and the output signal from the element 406 is the signal F'. Register 400 intakes bits F' until the sequence F is found again.

Time base 110 transmits to the octet address register 410 the 7 bits representing the rank of the time slot of the 2.048 Mbits/s multiplex, the 7 bits being placed in stages $410_1$ to $410_7$ of register 410.

Register 400 stores seriatim the 7-bit words deduced from the bits of the multiframing sequence it receives. However, the consecutively stored words do not form part of the same multiframing sequence but relate to 256 interleaved multiframing sequences. Register 400 must therefore operate on a time division basis and is accordingly associated with a store 412 adapted to store 256 7-bit words; in each cycle register 400 places in store 412 the 7-bit word relating to one of the 256 multiplexed channels which it has just received and extracts from store 412 the 7-bit word relating to the next channel and stored therein.

Also, stages $400_1$ to $400_7$ are connected to stages $410_8$ to $410_{14}$ of the octet register 410 by way of a transcoder 413 and a selective inhibition circuit 414. The function of transcoder 413 is to convert the 7-bit combinations of the multiframing sequence which are not consecutive into pure binary combinations which are consecutive. Transcoder 413 can be a dead store containing pure binary numbers from 0 to 79 and addressed by register 400.

As already stated, the second part of the octet address consisted of 3 or 5 or 7 bits according to the kind of multiplexing experienced by the octets at the multiplex 2.048 Mbits/s interfaces. Consequently, since the multiplexing scheme applied to the octets is known, the 5 or 20 or 80-octet frame contained in the 80-octet multiframe is known in dependence upon the channel number at the 2.048 Mbits/s interfaces. Time base 110 of multiplexer 11 controls circuit 414 so that, depending upon the number of the multiplex channel, only 3 or 5 bits are gated or on the contrary the 7 bits of the maximum-capacity address are gated.

The octet address computer 40 just described is so devised that the octet address register 410 provides at any time the address of the octet transmitted by the interfaces $2_0$ to $2_7$ with 3 or 5 or 7 bits, depending upon the multiplexing scheme.

Address computer 40 addresses in read-out the marking store 50 of the switching network. Store 50 contains markers comprising: at least one status bit BE indicating whether the data channel from which an octet is being received is in use for data transmission or for ringing or selection purposes; and the address of the correspondent, if data transmission is proceeded, or of the trunking bits, if ringing or selection are proceeding.

An information octet OcI, its address AOc and the marker MMa are then transmitted via line 51 to control unit 52. If a data transmission is proceeded, octet OcI is written into buffer store 53 at the address read in marking memory 50. Accordingly, the status bit BE of the marker read in store 50 opens the gates 54 which connect the interfaces $2_0$, $2_7$ transmitting the information octet OcI to the data inputs of buffer store 53 and also opens the gates 55 which connect the marking store 50 to the addressing inputs of buffer store 53.

If ringing or selection signal transmission is proceeded, a "signalling" octet OS delivered by control unit 52 is written into the buffer store at the address AOc of the arriving octet. Consequently, the "signalling" is transmitted to the caller. Accordingly, the status bit BE of the marker acts via way of inverter 59 to open the gates 56 connecting the control unit to the data inputs of buffer store 53 and to open the gates 57 connecting the octet address computer 40 to the addressing inputs of store 53. To change a data channel over from "signalling" transmission to data transmission and vice-versa, the pending condition can be marked during the "signalling" transmission, such condition being indicated by the trunking bits of the marker; the control unit 52 transmits a fresh marker to marking store 50, accompanied by the address where it is to be written in the store 50. Also, control unit 52 transmits to store 50 an order to write the nex marker into such address. Consequently, trunking or release between subscribers proceeds on the basis of consecutive markers.

The reading of the buffer store 53 is controlled by time base 110. In a manner similar to what has been described with reference to FIG. 3, the first bits of the octets written into buffer store 53 are removed during write-in and are replaced at read-out by the bits F of a multiframe locking sequence produced by generator 58. Of course, the bits of the multiframing locking sequence will be carried by the octets of a single 2.048 Mbits/s multiplex channel. However, since all the 2.048 Mbits/s multiplex channels are phase-locked at their outputs, the bits of the time division multiframing locking sequences need not be applied to the octets. The first bit of the sequence can be applied to the 256 outgoing multiplex channels of the first frame, and then the second bit of the sequence can be applied to the 256 outgoing multiplex channels of the second frame, and so on up to the 80th bit of the sequence. In brief, the 256 multiframing locking sequences of the octets of the frames of 256 multiplex channels, such sequences being out of phase in the case of the incoming multiplex channels, are in phase in the case of the outgoing multiplex channels.

The octets provided with their multiframing locking sequence bits and appearing in parallel at the multiplex 2.048 Mbits/s interfaces $1Q2_0$ to $102_7$ are applied to a demultiplexer 11' which converts the eight parallel 2.048 Mbits/s multiplexes $102_0$ to $102_7$ into 256 64 kbit/s series multiplexes $101_0$ to $101_{255}$. Demultiplexer 11' uses the same time base 110 as multiplexer 11 and has a parallel-to-series converter 112' and a buffer store 111'.

It has been assumed, symmetrically in respect of FIG.

2, that the multiplex channel $101_0$ was demultiplexed into five elementary 12.8 kbit/s channels $103_0$ to $103_4$ in demultiplexer 113, the multiplex channel $101_1$ was demultiplexed into 20 elementary 3.2 kbit/s channels $104_0$ to $104_{19}$ in demultiplexer 114 and multiplex channel $101_2$ was demultiplexed into 80 elementary 800 bit/s channels $105_0$ to $105_{79}$ in demultiplexer 115.

Each demultiplexer 113, 114, 115 comprises a respective time base 1130, 1140, 1150 and a respective buffer store 1131, 1141, 1151. Associated with each demultiplexer 113–115 is a multiframing locking and overlap circuit 123, 124, 125 respectively of the kind shown in FIG. 4. The output of the transcoder of the latter circuit is used as an addressing register of the demultiplexer buffer store.

What we claim is:

1. A time division digital switching network comprising:

first multiplexing means in which first-order digital data channels transmitting words consisting of a given number of bits and having first rates which are different from but multiples of one another undergo a first multiplexing converting them into second-order digital data channels having a second predetermined rate;

second multiplexing means in which said second-order digital channels undergo a second multiplexing converting them into third-order digital data channels having a third predetermined rate; and a digital switching unit having at least one buffer store in which the first-order-channel words multiplexed into the third-order channels are grouped at an address having first and second part and whose first part depends upon the second-order channel they occupy in the third-order channel and whose second part depends upon the first-order channel they occupy in the second-order channel, the bits of a given rank of the words of a second-order channel forming a pseudorandom sequence having a known period and, therefore, the bits of a given rank of the words of a third-order channel forming a number of interleaved pseudorandom sequences;

the said switching network being characterized in that said digital switching unit includes means for separating the interleaved pseudorandom sequences and for deducing from the bits comprising them said second part of the address of the words.

2. A switching network according to claim 1, in which said words consisting of a given number of bits are octets and the bits of a given rank forming a pseudorandom sequence are the first bits of the octets.

3. A switching network according to claim 1, in which the first different rates which are multiplex of one another and which undergo the first multiplexing are 12.8, 3.2 and 0.8 kbit/s.

4. A switching network according to claim 1, comprising a generator producing a pseudorandom sequence of period N consisting of a shift register having a number $n$ of stages and an "Exclusive OR" gate whose two inputs are respectively connected to an intermediate stage and to the final stage of said shift register and whose output is so connected to the register input stage as to reintroduce thereinto a reinsertion bit equal to the logic sum of the bits in the intermediate and final stages, said generator comprising a circuit for shortening the period of latter said sequence from $(2^n-1)$ to N, said shortening circuit consisting of a decoder of a predetermined n-bit word; said network further including means for inverting said reinsertion bit, latter said means being controlled by said decoder, and means for inserting the bits of said shortened pseudorandom sequence into the words transmitted by the second-order channels in the form of bits of given ranks of the latter words.

5. A switching network according to claim 4, in which the digital switching unit comprises a generator producing a pseudorandom sequence of period N and consisting of a shift register and a shortening circuit, and in which there are also provided means for synchronizing said generator, a transcoder of the words located in the $n$ stages of said shift register and formed by the bits of said pseudorandom sequence into binary words, a store associated with said shift register and operating at the rate of the third-order channels, and means for so transferring the words of said pseudorandom sequence from said register to the store and vice versa as to separate out the interleaved pseudorandom sequences corresponding to the second-order channels.

6. A switching network according to claim 1, in which the digital switching unit comprises a store containing one word per incoming data channel, and in which the latter word contains: at least one status bit indicating whether the associated data channel is in use for data transmission or for ringing and trunking purposes, and the address of the correspondent, if data transmission is proceeded, or of the trunking bits, if a ringing or trunking are proceeded.

* * * * *